May 30, 1939.  H. C. GESSLER  2,160,585
ICE CREAM DISHER
Filed May 25, 1938
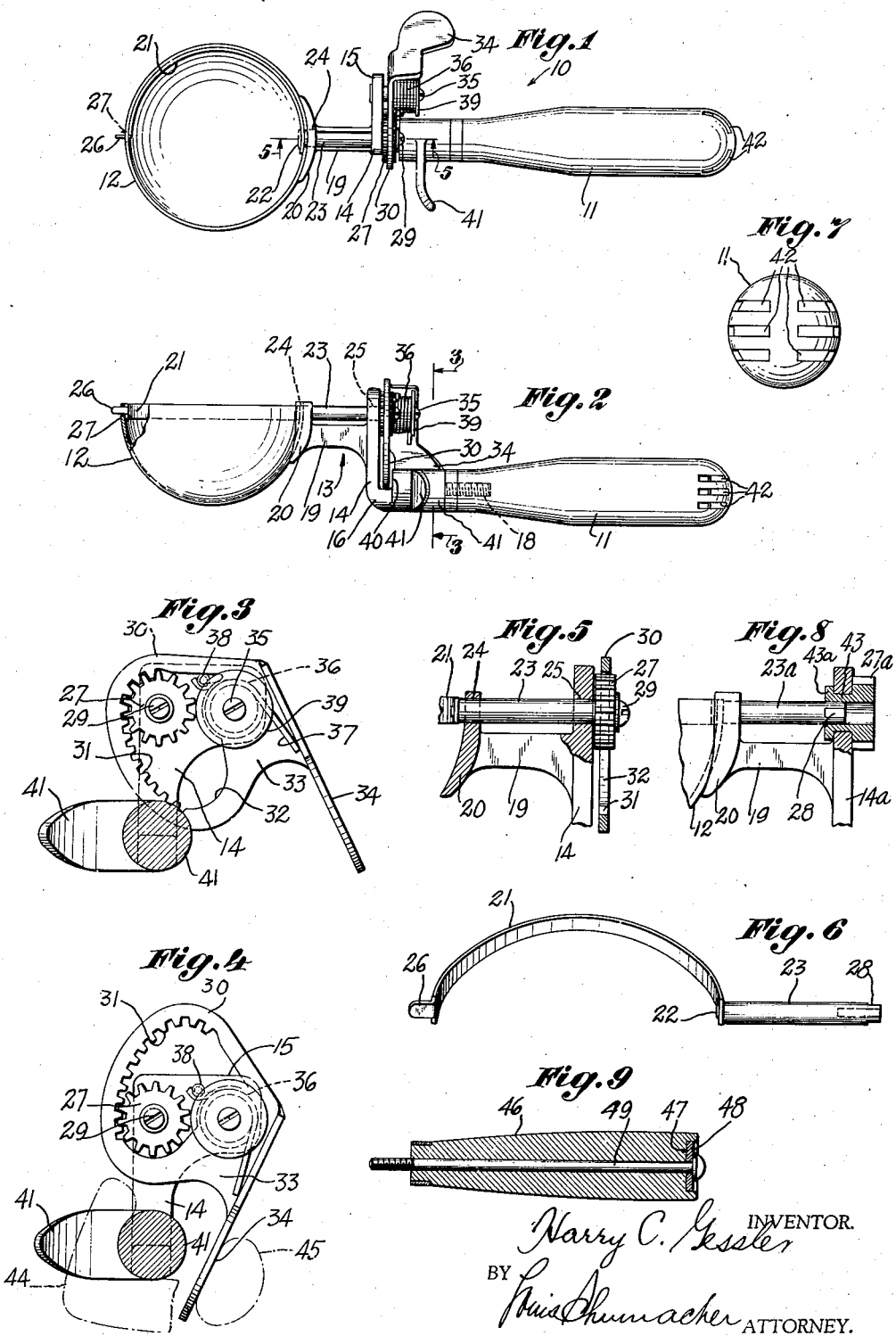
INVENTOR.
Harry C. Gessler
BY
Luis Shumacher ATTORNEY.

Patented May 30, 1939

2,160,585

UNITED STATES PATENT OFFICE 2,160,585

ICE CREAM DISHER

Harry C. Gessler, Brooklyn, N. Y.

Application May 25, 1938, Serial No. 209,893

3 Claims. (Cl. 107—48)

This invention relates to ice cream scoops and similar devices.

One object of the invention is to provide an ice cream scoop having improved means for the removal and replacement of a blade without requiring that any of the gears be discarded.

Heretofore difficulty has been encountered by breakage of blades, since these are subjected to a very high stress in scraping hard ice cream. The high strain involved has necessitated the use of permanent shaft connections for the blade. In consequence, when a blade had to be replaced its shaft and also the pinion connected thereto had to be discarded. This rendered blade replacement rather expensive. It is accordingly an object of the invention to avoid this drawback and further to permit replacement of the blade without any substantial disassembling of the gear mechanism.

Another object of the invention is to provide an improved device which in the ice cream scooping position is held in the hand with the palm facing downward and the thumb being close to the palm, whereby considerable scooping pressure may be conveniently exerted.

Another object of the invention is to provide an ice cream scoop which includes improved means comprising an internal gear sector whereby the hand is protected from contact with the teeth thereof.

Another object of the invention is to furnish a device of the type mentioned wherein improved means including a large eccentric gear sector is normally guided in a section of the handle to prevent distortion of the gear sector at a point remote from the axis thereof.

Another object of the invention is to provide a device having a handle formed with improved indicator means comprising protective recesses having colored marks to indicate the nature or capacity of the device.

A further object of the invention is to provide a device of the class alluded to having few and simple parts, which are inexpensive to manufacture and assemble, and said device being neat, compact, easy to clean, convenient, durable, reliable and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a top plan view showing a device embodying the invention, in the normal unoperated view thereof.

Fig. 2 is a view in side elevation thereof.

Fig. 3 is a sectional view taken on the line 3—3 of Fig. 2.

Fig. 4 is a similar view showing the gear mechanism in fully operated position, with certain fingers in dot-dash lines.

Fig. 5 is a longitudinal sectional view taken on the line 5—5 of Fig. 1.

Fig. 6 is a perspective view of the removable blade unit.

Fig. 7 is an end view of the handle showing certain indicator means.

Fig. 8 is a fragmentary sectional view of a modified mechanism.

Fig. 9 is a sectional view of a modified indicator handle.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device such as an ice cream scoop embodying the invention. The same may include a handle 11, a bowl 12, and a frame 13 interconnecting the same so that the bowl is partially above the handle. The frame may include a vertical plate-like section 14 having a laterally projecting arm 15. From the bottom of the section 14, there extends an arm terminating in a head 17 having a screw 18 that is threaded axially into the handle. About half way up the section 14 is an arm 19 flanged as at 20 for soldered or welded connection to the bowl 12.

Within the bowl is a semicircular blade 21 welded or riveted at one end 22 to an adjacent end of a shaft 23 which is journaled in an opening 24 of the flange 20 and in an opening 25 of the plate section 14. The other end of the blade may have a bearing portion such as an undercut part 26 that is bent into alinement with the shaft 23 and is journaled in an opening 27 of the bowl 12.

One end of the shaft 23 may be arranged for detachable connection with a pinion 27 so that the latter can cause rotation of the shaft. For instance, the shaft may have a squared or flattened end 28 removably fitted in a corresponding opening of the pinion 27, and having engagement with a screw 29 which serves to hold the pinion on the shaft 23.

Coacting with the pinion 27 is an internal gear element 30 affording a segmental gear section 31 and an opening 32 of arc shape to permit the relative motion indicated by a comparison of Figs. 3 and 4. The gear element 30 may form part of a larger plate 33 having a thumb actuator portion 34. Rotatably mounting the gear element 30 is a stub shaft or screw 35 which extends through the plate 33 and is affixed to the plate portion 14. Extending around the screw 35 is a torsion coil spring 36, one end of which 37 bears against the thumb piece 34, and the other end of which bears against a pin 38 that is affixed to the plate 14. Said pin 38 also has stop coaction with the gear element 30 in the opening thereof as shown in Fig. 3. A washer 39 on the screw 38 may laterally support the spring.

It will be noted that in the initial or normal position of the device shown in Figs. 2 and 3, the gear element 30 has its lower portion extending into a narrow recess or guide 40 which affords lateral support to the gear element as in the event of an accidental impact in the longitudinal direction of the device, against the thumb piece 34, or against the lower right portion of the gear element 30, as seen in Fig. 3. This arrangement is important to prevent the gear element 30 from becoming bent and thus going out of mesh with the pinion 27. The arrangement is accomplished without the use of any added parts or metal, and without interfering with the assembling or use of the device.

If desired, a hand rest 41 may extend laterally from the head 17.

At the free end of the handle 11, the same may be provided with a series of recesses 42 adapted to receive therein different colors to serve as indicators for the capacity of the bowl 12. Usually an ice cream store uses several scoops for different quantities of ice cream, these scoops usually stand in water with the handles uppermost. By using, for instance, red to indicate one size of bowl 12, and blue to indicate a different size, the operator can directly grasp the particular scoop that he desires to use.

In Fig. 8 is shown a modified form of the invention wherein the screw 29 is dispensed with, the pinion 27a having a hollow stub shaft 43 journaled in the plate section 14a and having an irregular internal cross section to engage the shaft 23a at its end, to cause rotation of the shaft for operating the blade 21. It will be noted that the shaft 43 is peened over as at 43a for permanent securement. Otherwise the organization and mode of operation is the same as in the device 10.

The manner of replacing the blade 21 will now be described. In the device 10, the screw 29 is first removed, and then the pinion 27 is removed, whereupon the blade is turned outward and is sprung or contracted along a diameter to remove the portion 26 from its bearing, thus permitting the easy removal of the blade and shaft unit of Fig. 6. By a simple reverse operation, a new blade and shaft unit may be applied and assembling completed.

In use, the operator grasps the handle 11 with the palm of the hand down, and scoops into the ice cream. Then he applies pressure to the thumb piece 34 so that the gear mechanism rotates the blade to cut the ice cream clean from the bowl 12 for easy discharge. In so doing, the fingers extend around the handle as indicated in dot-dash lines at 44 and the thumb at 45 closely approaches the fingers and the palm of the hand so that a powerful pressure can be exerted on the thumb piece 34.

In Fig. 9 is shown a modified indicator handle 46 which may consist of wood, and having an end recess 47 for receiving a colored washer 48. The latter may be secured by a screw 49 which projects at the other end of the handle to engage a frame such as 19.

I claim:

1. An ice cream disher comprising a bowl open along a plane, a frame secured to the bowl and having an arm at an angle to said plane, a resilient curved scraper blade for the interior of the bowl, a spindle connected to one end of the blade for oscillating the same, the other end of the blade having a portion removably journaled in said bowl at a point remote from the frame arm, a pinion having an integral hollow shaft journaled in said arm, said pinion lying on a side of the arm remote from the bowl with its hollow shaft projecting toward the bowl, the hollow shaft having at its free end an integral outward projecting lip engaging said arm at a side thereof opposite to said pinion to rotatably retain the latter, said spindle having an end portion projecting into the hollow shaft, the latter and the spindle having axially extending irregularities nonrotatably engaging the hollow shaft with the spindle, the latter being otherwise freely axially removable from the hollow shaft on springing said blade, said lip constituting an annular reenforcement for the hollow shaft at its point of engagement with the spindle, and means for actuating said pinion, the blade and its spindle being removable as a unit for replacement by springing the blade and without disturbing the remaining parts or mechanism.

2. An ice cream disher comprising a bowl open along a plane, a frame secured to the bowl and having an arm at an angle to said plane, a resilient curved scraper blade for the interior of the bowl, a spindle connected to one end of the blade for oscillating the same, the other end of the blade having a portion removably journaled in a bearing portion of said bowl at a point remote from the frame arm, a pinion having an integral hollow shaft journaled in said arm, the hollow shaft having at its end remote from the pinion, an integral outward extending lip engaging said arm to retain the hollow shaft in position, said spindle having an end portion projecting into the hollow shaft, the latter and the spindle having axially engaging irregularities to prevent relative rotation between the spindle and the hollow shaft, the latter and the spindle being maintained in engagement by the blade and being axially releasable by axially springing the blade toward the said bearing portion of the bowl, and means for turning the pinion.

3. An ice cream disher comprising a bowl open along a plane, a frame secured to the bowl and having an arm at an angle to said plane, a resilient curved scraper blade for the interior of the bowl, a spindle connected to one end of the blade for oscillating the same, the other end of the blade having a portion removably journaled in said bowl at a point remote from the frame arm, a pinion having an integral hollow shaft journaled in said arm, said pinion lying on a side of the arm remote from the bowl with its hollow shaft projecting toward the bowl, the hollow shaft having at its otherwise free end a member engaging said arm at a side thereof opposite to that of said pinion to prevent removal of the hollow shaft, said spindle projecting into the latter and being thus retained by the blade, the spindle and hollow shaft having axially engaging means to prevent relative rotation, the spindle being freely axially engageable and disengageable with the hollow shaft, on flexing the blade, and means for rotating said pinion, the blade and spindle forming a unit that is easily mounted and removed for replacement without disturbing any associated parts of the device.

HARRY C. GESSLER.